US008369868B2

(12) United States Patent
Choi

(10) Patent No.: US 8,369,868 B2
(45) Date of Patent: Feb. 5, 2013

(54) LOCATION SERVICE BASED SECURE USER PLANE LOCATION

(75) Inventor: Jae-Hyuk Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 12/523,919

(22) PCT Filed: Jan. 30, 2008

(86) PCT No.: PCT/KR2008/000570
§ 371 (c)(1),
(2), (4) Date: Jul. 21, 2009

(87) PCT Pub. No.: WO2008/093998
PCT Pub. Date: Aug. 7, 2008

(65) Prior Publication Data
US 2010/0015998 A1    Jan. 21, 2010

Related U.S. Application Data

(60) Provisional application No. 60/887,658, filed on Feb. 1, 2007, provisional application No. 60/974,406, filed on Sep. 21, 2007.

(30) Foreign Application Priority Data

Jan. 29, 2008    (KR) .................. 10-2008-0008986

(51) Int. Cl.
*H04W 24/00* (2009.01)
(52) U.S. Cl. ............... 455/456.1; 455/456.6; 455/456.3; 455/432.1; 340/539.13; 370/331; 370/359
(58) Field of Classification Search .................. None
See application file for complete search history.

(56) References Cited

U.S. PATENT DOCUMENTS

| 2005/0250516 | A1* | 11/2005 | Shim .................. 455/456.1 |
| 2006/0058042 | A1 | 3/2006 | Shim |
| 2006/0246919 | A1 | 11/2006 | Park et al. |
| 2006/0293066 | A1* | 12/2006 | Edge et al. .................. 455/456.3 |
| 2007/0182547 | A1* | 8/2007 | Wachter et al. .......... 340/539.13 |

* cited by examiner

*Primary Examiner* — Marcos Batista
*Assistant Examiner* — Keith Fang
(74) *Attorney, Agent, or Firm* — Birch, Stewart, Kolasch & Birch, LLP

(57) ABSTRACT

An IP connection is released when a SUPL-based periodic triggered service starts, so as to prevent consumption of network resources. After releasing the IP connection, if a location is measured thereby to generate location information, only the fact that the location has been measured is notified to a requester, and the requester is allowed to receive the location information only when a secure transmission is ensured after the notification, thereby avoiding the location information from being exposed externally.

15 Claims, 6 Drawing Sheets

LOCATION SERVICE BASED SECURE USER PLANE LOCATION

This application is the National Phase of PCT/KR2008/000570 filed on Jan. 30, 2008, which claims priority under 35 U.S.C. 119(e) to U.S. Provisional Application Nos. 60/887,658 filed on Feb. 1, 2007 and 60/974,406 filed on Sep. 21, 2007 and under 35 U.S.C. 119(a) to Patent Application No. KR-10-2008-0008986 filed in Korea on Jan. 29, 2008, all of which are hereby expressly incorporated by reference into the present application.

TECHNICAL FIELD

The present invention relates to a location information service, and more particularly, to a location service based upon a Secure User Plane Location (SUPL).

BACKGROUND ART

In general, a wireless communication system provides a location service for transmitting the location of a mobile terminal to a certain entity periodically or according to a request, by including a relevant function part for calculating the location of the mobile terminal in a network.

A location service-related network structure varies according to an internal network structure such as 3GPP or 3GPP2. Methods for calculating the current location of a mobile terminal include a cell-ID method for transferring an ID of a cell to which the mobile terminal belongs, a method for measuring the time taken for radio waves of the mobile terminal to reach each base station and calculating the location of the mobile terminal by using the trigonometric measurement, and a method for using a global positioning system (GPS).

In order to provide the location service to a user, a considerable of signaling and location information needs to be communicated between the mobile terminal and a location server.

Thus, standard positioning technologies for providing the location service, namely, a location service based on a location of a mobile terminal, have been rapidly spreading. The technologies can be generally provided through a user plane and a control plane. A SUPL (Secure User Plane Location) method is one of the technologies, which provides the location service through the user plane.

The SUPL method is an effective method of transferring location information required for calculating the location of a mobile terminal. That is, in order to provide assistance information such as GPS assistance and in order to bear a position technology-related protocol between the mobile terminal and the network, the SUPL method uses a user plane data bearer.

In a general location information system, the SUPL network related to the location service includes a SUP agent, a SUPL Location Platform (SLP) and a SET (SUPL enabled terminal). The SUPL agent is a logical service access point that uses the actually measured location information. The SLP is a SUPL service access point of a network part for accessing network resources to obtain location information, which calculates an actual location or perform roaming, resource management and the like. The SET is a device which can communicate with the SUPL network using a SUPL interface, and supports definition procedures in the SUPL by interworking with the network via the user plane bearer. For example, the SET can be one of a UE (User Equipment) of UMTS, a MS (Mobile Station) of GSM, a laptop computer having a SET function, or a PDA (Personal Digital Assistants). In the alternative, the SET can be various mobile terminals which are connected through a WLAN (Wireless Local Area Network).

In the location service, a network for which a user has originally registered is called a home network, and when the user moves or roams to an area other than the home network area, the network of that the other area is called a visited network. A SLP in the home network is called an H-SLP (Home-SLP) while a SLP in the visited network is called a V-SLP (Visited-SLP).

When a SUPL procedure starts in the network of the location information system, a SLP to which an external client is first connected is called an R-SLP (Requesting-SLP). The R-SLP is a logical entity, which can be the same as the H-SLP or not. A SET aimed to track its current location is called a target SET.

Two types of the SUPL-based location services are provided, including an area event triggered service which provides a location of a target SET (i.e., mobile terminal) when preset conditions related to a certain area is satisfied, and a periodic triggered service which provides a location of a target SET (i.e., mobile terminal) according to a preset period.

Such two types of SUPL-based location services will now be described in more detail with reference to the drawings.

FIG. 1 is an exemplary view of a periodic triggered service based on a SUPL according to the related art. Hereinafter, each process is described with reference to FIG. 1.

A) A SUPL agent within a SET#1 11 desires to be periodically known of a location of a target SET, namely, SET#2 12. If any data connection is not yet established between the SET#1 11 and a network, the SET#1 11 sets the data connection with the network.

B) The SUPL agent establishes an IP connection with a SLP#1 21 by using a previously received address, and then sends a session start message (e.g., SUPL SET INIT) to establish a session with the SLP#1 21 for the periodic triggered service. Here, the SUPL SET INIT message may include several parameters such as a session-id, an ID of the target SET (i.e., an ID of the SET#2 12), a triggered service mode and trigger information. Here, the triggered service mode parameter indicates whether a service requested is a periodic triggered service or an area event triggered service.

C) The SLP#1 21 receives the SUPL SET INIT message, and searches for a SLP#2 22 which manages the target SET (i.e., the SET#2 12) by using the ID parameter of the target SET included in the SUPL SET INIT message. Here, the SLP#1 21 searches for the SLP#2 22 via a DNS server or other entities.

D) The SLP#1 21 requests the periodic triggered service from the SLP#2 22 managing the target SET (i.e., SET#2 12).

E) In response to the request, the SLP#2 22 check whether or not the SET#1 11 is granted permission to acquire the location of the SET#2 12. The SLP#2 22 then starts the periodic triggered location service for the SET#2 12 according to the request.

F) If information related to a previously measured location exists for the SET#2 12 or a first location measurement (positioning) is completed, the SLP#2 22 sends a response message to the SLP#1 21. Here, the response message includes the location information related to the SET#2 12.

G) Upon receiving the response message, the SLP#1 21 sends a SUPL report message, e.g., SUPL REPORT to the SET#1 11. Here, the SUPL REPORT message includes a position parameter containing the location information related to the SET#2 12. The SUPL REPORT message also includes an index parameter indicating the number of times for positioning and a session-id parameter indicating ID of a session.

H) The SLP#2 22 periodically measures the location of the SET#2 12 according to the request, and then sends the measured location information to the SLP#1 21.

I) The SLP#1 21 sends a SUPL REPORT message including the measured location information to the SET#1 11.

J) Until a termination condition is met, the location of the SET#2 12 is periodically measured, and the measured location information is sent to the SET#1 11.

K) The SLP#2 22 finally measures the location of the SET#2 12, and upon satisfying the termination condition, the SLP#2 22 terminates the periodic triggered location service.

L) The SLP#2 22 sends the finally measured location information to the SLP#1 21.

M) The SLP#1 21 forwards the finally measured location information to the SET#1 11, and simultaneously sends a SUPL END message to the SET#1 11 to inform the end of the periodic triggered location service. Here, the SUPL END message includes a position parameter containing the finally measured location information. The SUPL END message also includes an index parameter indicating the number of times for positioning and the session-id parameter indicating the ID of the session.

After receiving the SUPL END message, then the SET#1 11 releases the IP connection with the SLP#1 21, and releases resources for the session.

As described above, since the SUPL-based periodic triggered service according to the related art is achieved only by a long-term IP connection, the resources of the SET and the network are unnecessarily consumed. That is, the SET#1 11 establishes the IP connection with the SLP#1 21 at the step B). The established IP connection is maintained until the SET#1 11 receives the SUPL END message from the SLP#1 21 at the step M). However, if a considerably long time is spent until the termination condition of the periodic triggered service is satisfied, constantly maintaining the IP connection requires many resources, resulting in a consumption of the resources. In particular, in spite of an intermittent transmission of the measured location information, continuously maintaining the IP connection causes unnecessary consumption of resources. For example, when the location of the SET#2 12 is measured five times at a 10-minute time interval, the measured location information is sent once per 10 minutes. However, even in this case, until measuring the location five times, namely, until 50 minutes elapse, the IP connection remains established, which accordingly causes the consumption of resources. Furthermore, if multiple SETs exist, the SLP#1 21 suffers exhaustion of resources.

In the meantime, FIG. 2 is an exemplary view showing an area event triggered service based on a SUPL according to the related art. Hereinafter, each process is described with reference to FIG. 2.

A) A SUPL agent in a SET#1 11 desires to be known when the location of a SET#2 12 is changed. If any data connection is not yet established between the SET#1 11 and the network, the SET#1 11 performs the data connection with the network.

B) The SUPL agent establishes an IP connection with a SLP#1 21 by using a previously received address, and sends a session start message (e.g., SUPL SET INIT) to the SLP#1 21 to establish a session therewith for an area event triggered service. Here, the SUPL SET INIT message includes parameters such as a session-id, an ID of a target SET (i.e., an ID of SET#212), a triggered service mode, and trigger information.

Here, the triggered service mode parameter indicates whether a service requested is a periodic triggered service or an area event triggered service.

C) After receiving the SUPL SET INIT message, the SLP#1 21 searches for a SLP#2 22 managing the target SET (i.e., SET#2 12) by using the ID parameter of the target SET included in the SUPL SET INIT message. Here, the SLP#1 21 searches for the SLP#2 22 via a DNS server or other entities.

D) The SLP#1 21 requests an area event triggered service from the SLP#2 22 managing the target SET (i.e., the SET#2 12).

E) In response to the request, the SLP#2 22 checks whether the SET#1 11 is granted permission to acquire the location of the SET#2 12. Also, the SLP#2 22 starts the area event triggered service for the SET#2 12 according to the request. That is, the SLP#2 22 starts monitoring whether the SET#2 12 moves to another location.

F) Upon starting the area event triggered service, the SLP#2 22 sends a response message to the SLP#1.

G) Upon receiving the response message, the SLP#1 21 sends a SUPL END message to the SET#1 11 to inform that the IP connection and the session do not have to be maintained since the service started. Here, the SUPL END message includes the session-id parameter indicating the session ID. After receiving the SUPL END message, the SET#1 11 releases the IP connection with the SLP#1 21 and releases resources for the session.

H) On the other hand, the SLP#2 22 keeps monitoring whether the location of the SET#2 12 is changed.

I) If the location of the SET#2 12 is changed, the SET#2 12 sends to the SLP#1 21 the measured location information related to the changed location.

J) The SLP#1 21 transfers the measured location information to the SET#1 11. Here, since the connection and the session have already been released, the SLP#1 21 transfers the measured location information according to a WAP PUSH method or a low security method such as an SMS method.

As such, in the SUPL-based area event triggered service according to the related art, the measured location information is transferred via the WAP PUSH method or the low security method such as the SMS method. Accordingly, such information may be exposed externally due to hacking or wrong forwarding, which may cause a severe problem of privacy intrusion.

DISCLOSURE OF THE INVENTION

Therefore, it is an object of the present invention to enable transferring of location information without a long-term IP connection in a SUPL-based periodic triggered service.

It is another object of the present invention to allow location information to be securely transferred in a SUPL-based area event triggered service.

To achieve these objects, there is provided a method for performing a SUPL-based location service comprising: a) receiving a response message from a server via an IP connection and a session which have previously been established, the response message indicating the start of a location service requested for a target terminal; b) releasing the IP connection with the server and maintaining the session with the server in response to the reception of the response message; c) receiving, from the server, one or more report messages indicating that the location of the target terminal has been measured.

In another embodiment of the present invention, a method for performing a SUPL-based location service comprises: a) establishing an IP connection and a session with a server; b) sending a session start message to the server to request a location service for a target terminal; c) receiving a response message from the server, the response message indicating that the requested service started; and d) releasing the IP connection with the server and maintaining the session with the server, in response to the reception of the response message.

In still another embodiment of the present invention, a method for performing a SUPL-based location service comprises: a) establishing an IP connection and a session with a source terminal; b) receiving from the source terminal a session start message including a location service request for a target terminal; c) sending a response message to the source terminal to inform that the requested service started; and d) releasing the IP connection with the source terminal and maintaining the session established with the source terminal.

MODES FOR CARRYING OUT THE PREFERRED EMBODIMENTS

Hereinafter, the embodiments according to the present invention will be described in more detail with reference to the accompanying drawings.

Throughout the drawings, a SUPL Enabled Terminal (SET) is exemplarily described. However, the SET may be one of a UE (User Equipment) of UMTS, a MS (Mobile Station) of GSM, a laptop computer having a SET function, or a PDA (Personal Digital Assistants). In the alternative, the SET may be various mobile terminals which are connected through a WLAN (Wireless Local Area Network).

Figure 1:
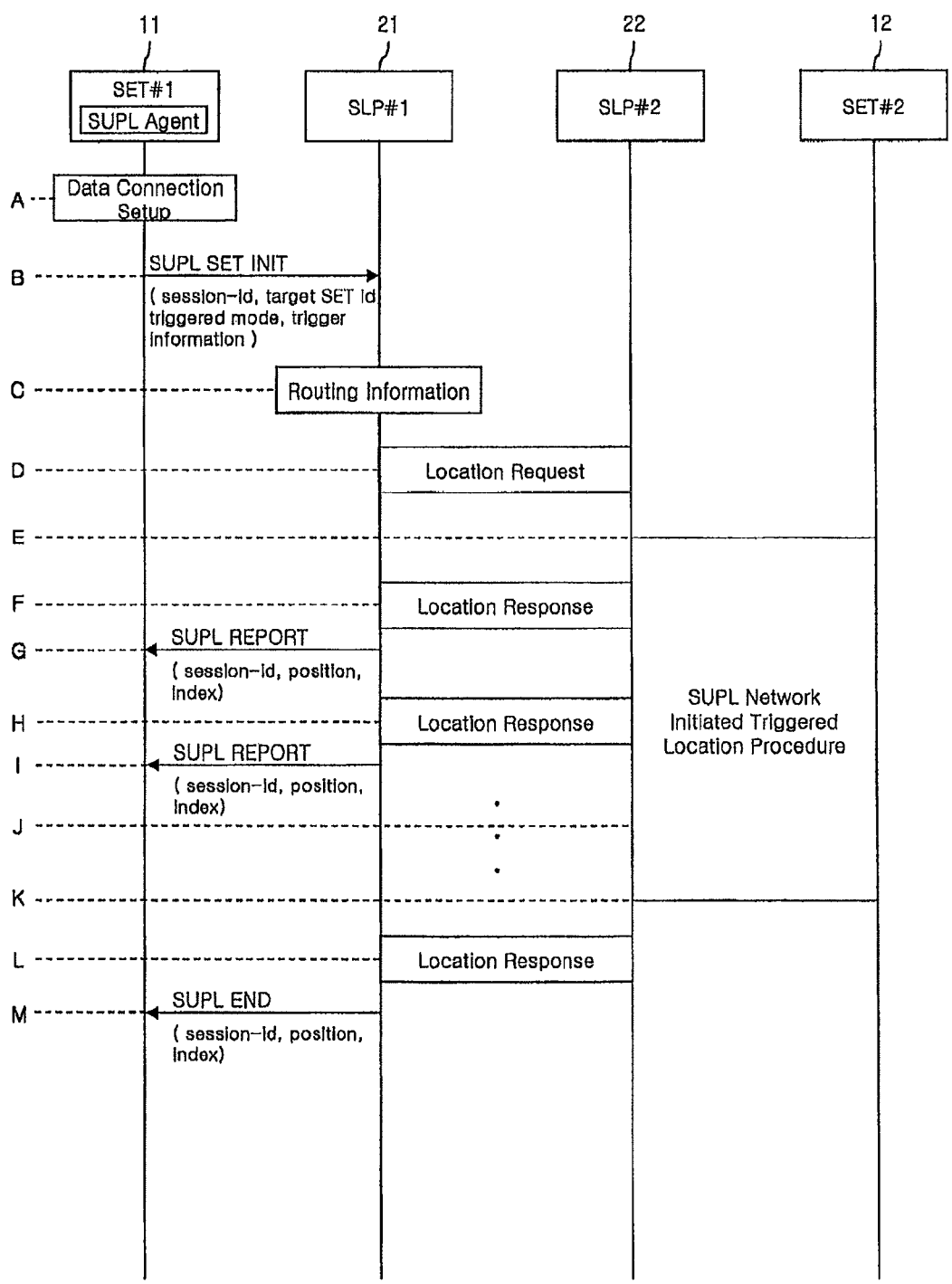
FIG. 1 is an exemplary view showing a SUPL-based periodic triggered service according to the related art.
Figure 2:
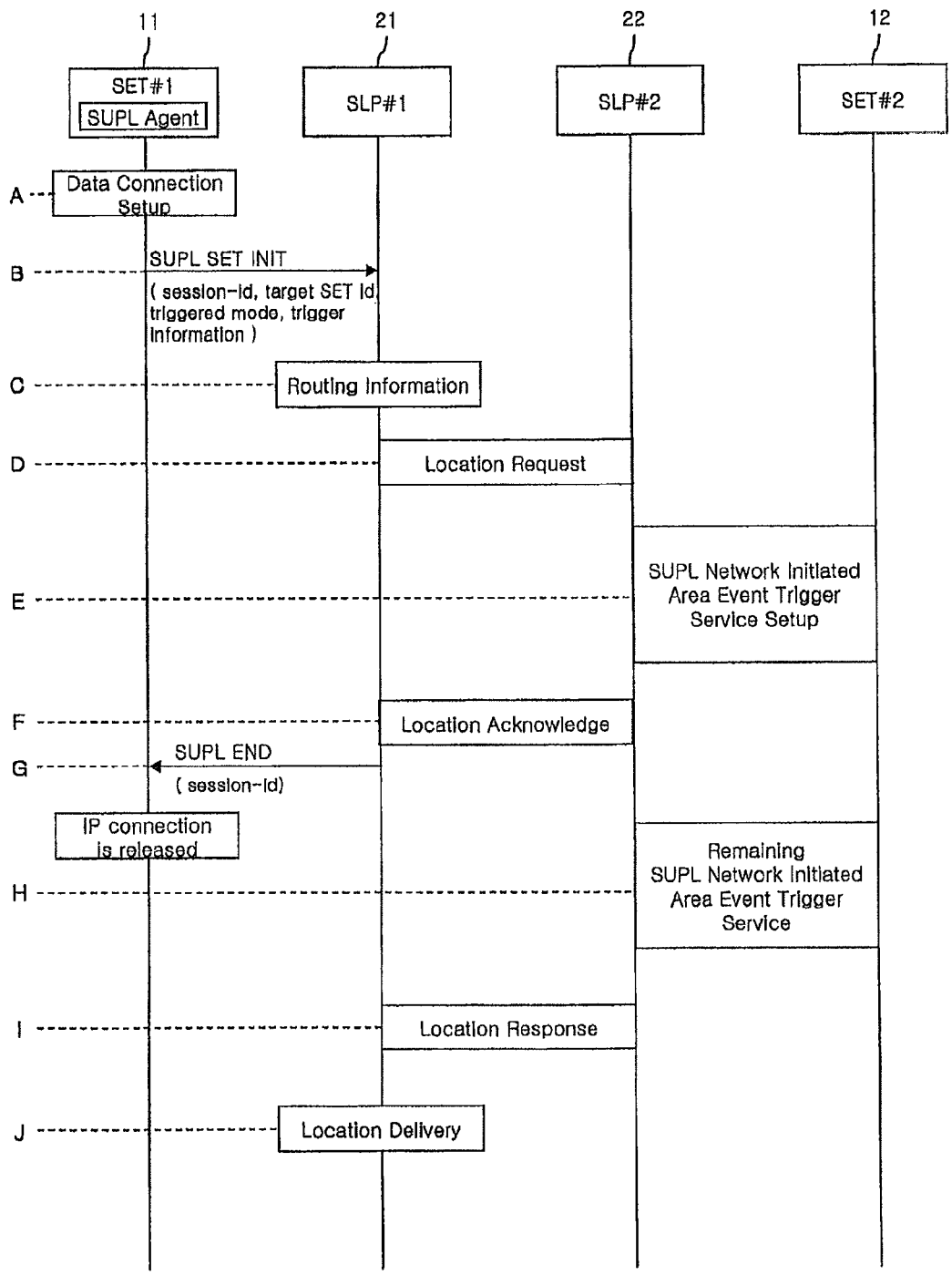
FIG. 2 is an exemplary view showing a SUPL-based area event triggered service according to the related art.
Figure 3:
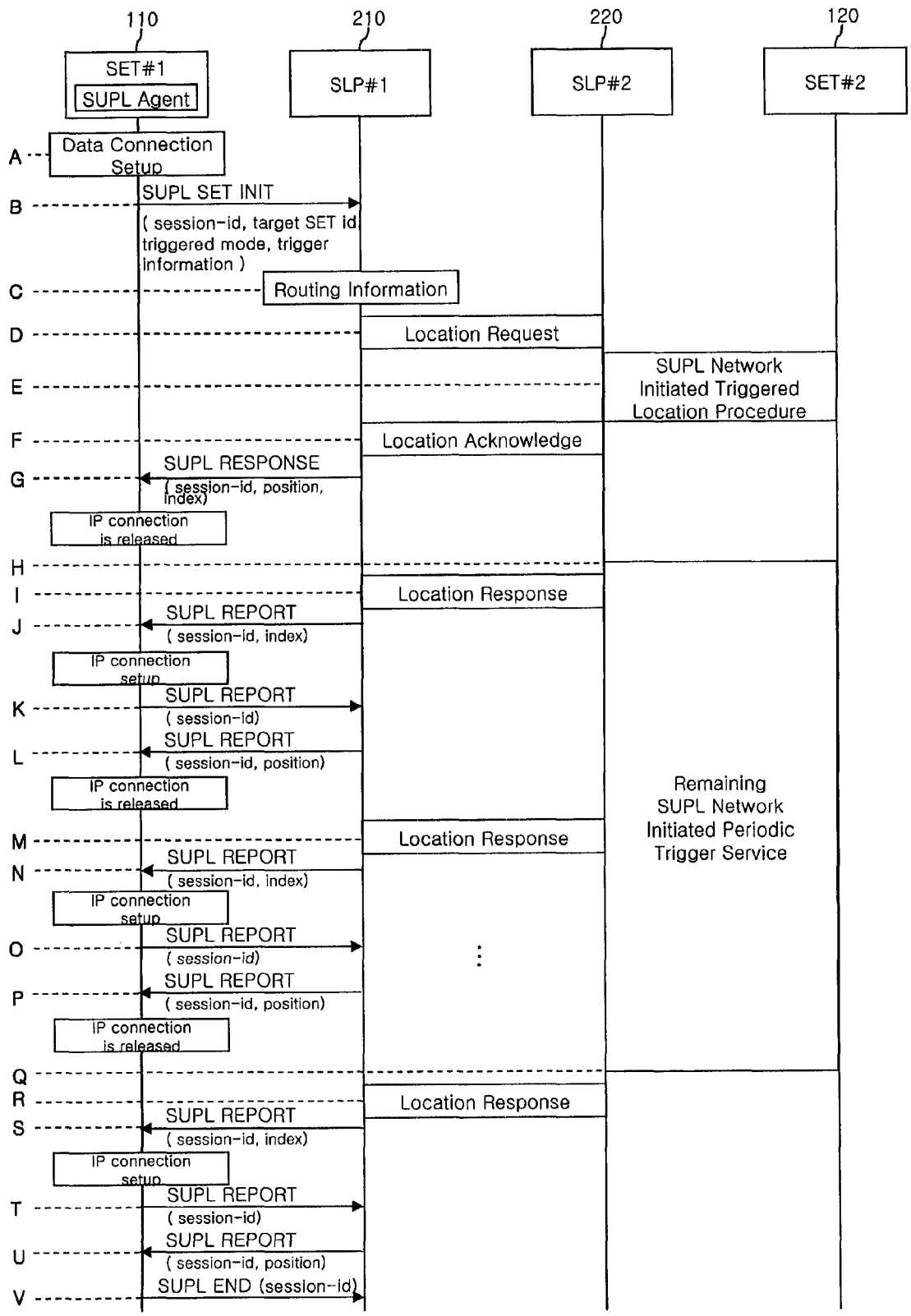
FIG. 3 is an exemplary view showing a SUPL-based periodic triggered service in accordance with a first embodiment of the present invention.

FIG. 3 is an exemplary view showing a SUPL-based periodic triggered service in accordance with a first embodiment of the present invention. For the sake of explanation, a signal flow between SLP#2 220 and SET#2 120 are not essential features of the first embodiment of the present invention, and a detailed explanation thereof will thusly be omitted. The contents disclosed in the standard document OMA-TS-ULP-V2_0-2007-12-02-D will be applied to this.

As shown in FIG. 3, the SUPL-based periodic triggered service according to the first embodiment of the present invention may be characterized as follows. That is, when starting to measure a location of the SET#2 120, the SLP#2 220 sends, for example, an acknowledge message to a SLP#1 210, which then sends a response message (e.g., SUPL RESPONSE) to the SET#1 110 having requested the positioning (location measurement) of the SET#2 120. The SET#1 110 is then allowed to release an IP connection with the SLP#1 210. On the other hand, if the location of the SET#2 120 is measured after the IP connection is released, only the fact that the location has been measured is notified to the SET#1 110, so as to avoid the location information related to the SET#2 120 from being exposed externally. Here, only when a secure transmission is ensured after the notification, the SET#1 110 can receive the location information from the SLP#1 210. For example, since the information related to the session is maintained, it is possible to reestablish only the IP connection later, thereby to securely receive the location information on the SET#2 120. Detailed description thereof is as follows.

A) A SUPL agent in the SET#1 110 desires to be periodically known of the location of a target SET (i.e., the SET#2 120). If any data connection is not yet established with a network (e.g., a packet data network), then the SET#1 110 performs the connection with the network.

B) The SUPL agent establishes a secure IP connection with the SLP#1 210 by using a previously received address, and sends a session start message, for example SUPL SET INIT, to the SLP#1 210 to establish a session therewith for a periodic triggered service. Here, the SUPL SET INIT message may include parameters such as a session-id, an ID of the target SET (i.e., an ID of the SET#2 120), a triggered service mode and trigger information. Here, the triggered service mode parameter may indicate whether a service requested is a periodic triggered service or an area event triggered service.

C) The SLP#1 210 receives the SUPL SET INIT message, and searches for the SLP#2 220 managing the target SET (i.e., the SET#2 120) by using the ID parameter of the target SET included in the SUPL SET INIT message. Here, the SLP#1 210 may search for the SLP#2 220 via a DNS server or other entities.

D) The SLP#1 210 requests the periodic triggered service from the SLP#2 220 which manages the target SET (i.e., the SET#2 120).

E) In response to the request, the SLP#2 220 examines whether the SET#1 110 is granted permission to acquire the location of the SET#2 120. The SLP#2 220 then starts the periodic triggered location service for the SET#2 120 according to the request. That is, the SLP#2 220 starts positioning (location measurement).

F) Upon starting the periodical triggered location service, the SLP#2 220 sends, e.g., an acknowledge message to the SLP#1 210 to inform that the requested service started. Here, If location information previously measured for the SET#2 120 exists, the SLP#2 220 sends the acknowledge message by including the location information related to the SET#2 120 therein.

G) After receiving the acknowledge message, the SLP#1 210 sends a response message, e.g., SUPL RESPONSE message to the SET#1 110 to inform that the requested service started. Here, the SUPL RESPONSE message may include the session-id parameter indicating a ID of the session. Also, if the SLP#1 210 has received the previously measured location information from the SLP#2 220, then the SLP#1 210 may send the SUPL RESPONSE message by including the previously measured location information therein. Here, the SUPL RESPONSE message may further include an index parameter indicating the number of times for positioning. Also, the SLP#1 210 may transfer the previously measured location information, separately from the response message. For example, if the response message just includes an indicator informing the existence of the previously measured location information, the SET#1 110 may receive the information which it requested from the SLP#1 210 after checking the indicator in the response message.

The SET#1 110 having received the SUPL RESPONSE message releases the secure IP connection with the SLP#1

210. However, the SET#1 and the SLP#1 210 maintain the session established therebetween.

H) Then, the SLP#2 220 periodically measures the location of the SET#2 120 according to the request.

I) After completing the first measurement of the location of the SET#2 120, the SLP#2 220 sends the first measured location information to the SLP#1 210.

j) The SLP#1 210 having received the first location information sends a report message, e.g., SUPL REPORT to the SET#1 110 to inform that the location of the SET#2 120 has been measured. The SUPL REPORT message may include at least one of the session-id parameter indicating the ID of the session and the index parameter indicating the number of times for positioning. On the other hand, since the secure IP connection has already been released, the SUPL REPORT message is sent by WAP PUSH, SMS or UDP/IP. However, since the SUPL REPORT message does not include the location information, it is possible to avoid the location information on the SET#2 120 from being exposed externally.

K) After receiving the SUPL REPORT message, the SET#1 110 requests the location information from the SLP#1 210 only when a secure transmission is ensured, so as to prevent the location information from being exposed externally. For example, as shown in the drawing, the SET#1 110 reestablishes the secure IP connection with the SLP#1 210. The SET#1 110 then sends a location information request message, e.g., SUPL REPORT message via the reestablished secure IP connection. The location information request message, e.g., the SUPL REPORT may include the parameter indicating the ID of the session.

L) Once receiving the location information request message, the SLP#1 210 transfers the location information to the SET#1 110 via the secure IP connection. The location information may be included, for example, in the SUPL REPORT message for transmission. Here, the SUPL REPORT message may further include the session-id parameter indicating the ID of the session and the index parameter indicating the number of times for positioning. On the other hand, the SET#1 110 having received the location information releases the secure IP connection with the SLP#1 210 again.

M) In the meantime, once completing a second measurement of the location of the SET# 120, the SLP#2 220 sends the second measured location information to the SLP#2 210.

N~P) The SLP#1 210 having received the second measured location information sends a report message (e.g., SUPL REPORT) to the SET#1 110 to inform that the location of the SET#2 120 has been measured. These steps are the same as the steps J~L described above, explanation of which will thusly be omitted.

Q) The location of the SET#2 120 is periodically measured until a termination condition is satisfied (or, met), and then a report message, e.g., SUPL REPORT is sent to the SET#1 110 to inform that the location has been measured.

R) When the termination condition is satisfied, the periodical triggered location service is terminated and the finally measured location information is sent to the SLP#1 210.

S) The SLP#1 210 sends a report message, e.g., SUPL REPORT to the SET#1 110 in order to inform that the location of the SET#2 120 has been finally measured. The SUPL REPORT message may include one or more of the session-id parameter indicating the ID of the session and an index parameter indicating the number of times for positioning. Because the secure IP connection has already been released, the SUPL REPORT message may be sent by the WAP PUSH, SMS or UDP/IP as mentioned above.

T) After receiving the SUPL REPORT message, the SET#1 110 requests the finally measured location information from the SLP#1 210 only when a secure transmission is ensured, so as to prevent the location information from being exposed externally. For example, as shown in FIG. 3, the SET#1 110 reestablishes the secure IP connection with the SLP#1 210. Accordingly, the SET#1 110 sends a location information request message, e.g., SUPL REPORT message to the SLP#1 210 via the reestablished secure IP connection. The location information request message may include the parameter indicating the ID of the session.

U) After receiving the location information request message, the SLP#1 210 transfers the finally measured location information to the SET#1 110 via the secure IP connection. The location information may be included, for example, in the SUPL REPORT message for transmission. Here, the SUPL REPORT message may further include the session-id parameter indicating the ID of the session and the index parameter indicating the number of times for positioning.

V) After receiving the finally measured location information, the SET#1 110 sends a SUPL END message to the SLP#1 210 via the secure IP connection to inform the end of the periodic triggered location service. Here, the SUPL END message may include the session-id parameter indicating the ID of the session. When the transmission is completed, the secure IP connection between the SET#1 110 and the SLP#1 210 is released and the session is then released.

As described above, in the first embodiment of the present invention, when the SUPL-based periodic triggered service starts, the IP connection is released, thereby saving network resources. Meanwhile, if there is any measured location information after the IP connection is released, a requester is notified only of the fact that the location has been measured. The requester having received the notification is allowed to receive the location information only when a secure transmission is ensured, so as to prevent the location information from being exposed externally.

Figure 4:
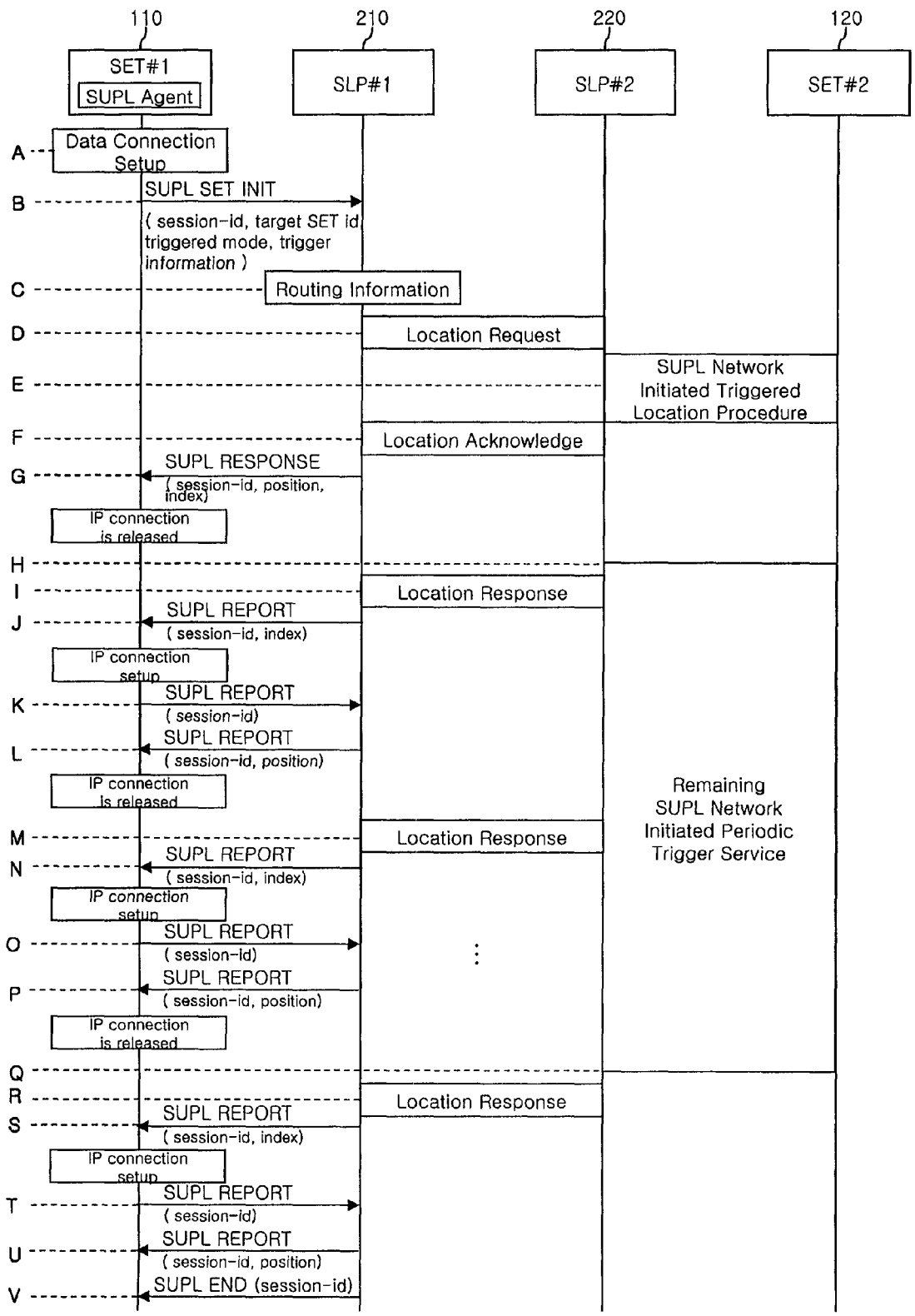
FIG. 4 is an exemplary view showing a SUPL-based period triggered service in accordance with a second embodiment of the present invention.

FIG. 4 is an exemplary view showing a SUPL-based period triggered service in accordance with a second embodiment of the present invention.

As shown in FIG. 4, the second embodiment of the present invention is nearly similar to the first embodiment as shown in FIG. 3. However, as shown in FIG. 4, the second embodiment is characterized in that the SLP#1 210 sends the SUPL END message to inform the termination (end) of the periodic triggered location service at the step V.

Figure 5:
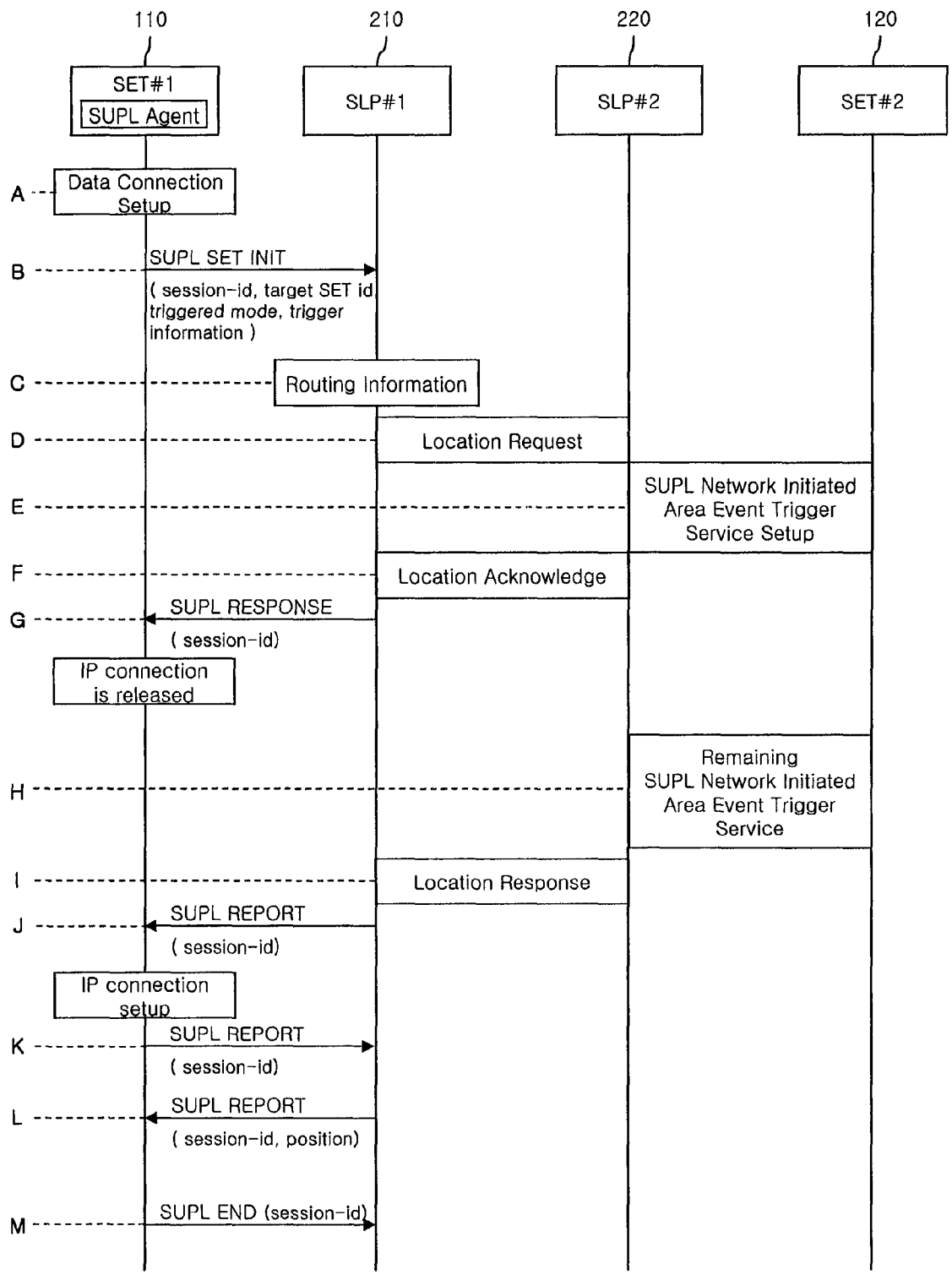
FIG. 5 is an exemplary view showing a SUPL-based area event triggered service in accordance with a third embodiment of the present invention.

In the meantime, FIG. 5 is an exemplary view showing a SUPL-based area event triggered service in accordance with a third embodiment of the present invention. For the sake of explanation, the signal flow between the SLP#2 220 and the SET#2 120 is not the essential features of the third embodiment of the present invention, and accordingly it will not be described in detail. Also, the contents disclosed in the standard document OMA-TS-ULP-V2_0-2007-12-02-D will be applied to this.

Since the location information is transferred according to the WAP PUSH method or a low security method such as the SMS method in the related art SUPL-based area event triggered service, probability of exposition to the exterior due to hacking or wrong transfer is increased. Accordingly, as shown in FIG. 5, in the SUPL-based area event triggered service according to the third embodiment of the present invention, only the fact that the location has been measured is notified. After the notification, the location information is allowed to be transferred only when a secure transmission is ensured, thereby preventing the location information from being exposed externally. Also, in the third embodiment of the present invention, the location information is allowed to be sent after reestablishing a secure IP connection, so as to prevent the exposition of the location information, which will now be described in more detail.

A) A SUPL agent in a SET#1 110 desires to be known when the location of the SET#2 120 is changed. If any data connection is not yet established with a network (e.g., a packet data network), the SET#1 110 performs the connection with the network.

B) The SUPL agent establishes a secure IP connection with a SLP#1 210 by using a previously received address, and sends a session start message, e.g., SUPL SET INIT to the SLP#1 210 to establish a session for an area event triggered service. Here, the SUPL SET INIT message may include parameters such as a session-id, an ID of a target SET (i.e., the ID of the SET#2 120), a triggered service mode and trigger information. Here, the triggered service mode parameter indicates whether a service requested is a periodic triggered service or an area event triggered service.

C) The SLP#1 210 receives the SUPL SET INIT, and searches for a SLP#2 220 managing the target SET (i.e., the SET#2 120) using the ID parameter of the target SET included in the SUPL SET INIT message. Here, the SLP#1 210 may search for the SLP#2 220 via a DNS server or other entities.

D) The SLP#1 210 requests an area event triggered service from the SLP#2 220 managing the target SET (i.e., the SET#2 120).

E) In response to the request, the SLP#2 220 checks whether the SET#1 110 is granted permission to acquire the location of the SET#2 120. The SLP#2 220 starts the area event triggered service for the SET#2 120 according to the request. That is, the SLP#2 220 starts monitoring whether the location of the SET#2 120 is changed.

F) Once starting the area event triggered service, the SLP#2 220 sends an acknowledge message to the SLP#1 210 to inform that the requested service started.

G) After receiving the acknowledge message, the SLP#1 210 sends a response message, e.g., SUPL RESPONSE to the SET#1 110 to inform the start of the requested service. Here, the acknowledge message, e.g., SUPL RESPONSE may include a session-id parameter indicating a session ID.

The SET#1 110 having received the SUPL RESPONSE message releases only the IP connection with the SLP#1 210. However, the session established between the SET#1 110 and the SLP#1 210 remains established.

H) Meanwhile, the SLP#2 220 continuously monitors whether the location of the SET#2 120 is changed.

I) If the location of the SET#2 120 is changed, the SET#2 120 sends information related to the changed location to the SLP#1 210.

J) The SLP#1 210 having received the location information sends a report message, e.g., SUPL REPORT to the SET#1 110 to inform that the location of the SET#2 120 has been measured. The SUPL REPORT message may include the session-id indicating the session ID. Here, since the secure IP connection has already been released, the SUPL REPORT message is sent by a WAP PUSH, SMS or UDP/IP. Here, the SUPL REPORT message does not include the location information, and accordingly the exposition of the location information related to the SET#2 120 to the exterior can be prevented.

K) After receiving the SUPL REPORT message, the SET#1 110 requests the location information from the SLP#1 120 only when a secure transmission is ensured, so as to avoid the exposition of the location information to the exterior. For example, as shown in the drawing, the SET#1 110 reestablishes the secure IP connection with the SLP#1 210. The SET#1 110 then sends a location information request message (e.g., SUPL REPORT) to the SLP#1 210 via the reestablished secure IP connection. The location information request message may include the parameter indicating the ID of the session.

L) The SLP#1 210 having received the location information request message transfers the location information to the SET#1 110 via the secure IP connection. The location information may be included, for example, in the SUPL REPORT message for transmission. Here, the SUPL REPORT message may further include the session-id parameter indicating the ID of the session.

M) After receiving the location information, the SET#1 110 sends a SUPL END message to the SLP#1 210 to inform the termination (end) of the area event triggered service via the secure IP connection. Here, the SUPL END message may include a session-id parameter indicating the ID of the session. Once completing the transmission, the secure IP connection between the SET#1 110 and the SLP#1 210 is released, and the session is then released.

Figure 6:
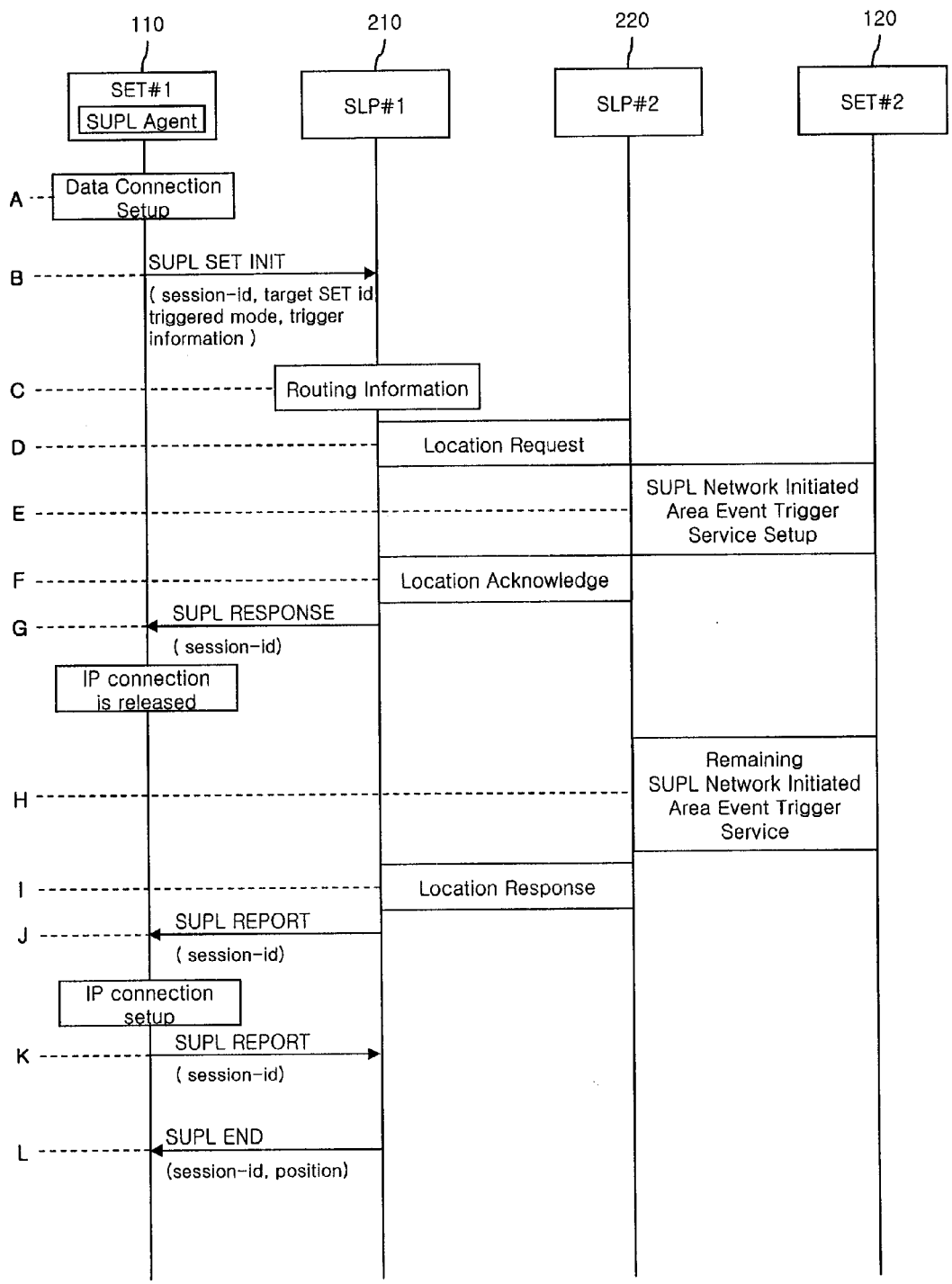
FIG. 6 is an exemplary view showing a SUPL-based area event triggered service in accordance with a fourth embodiment of the present invention.

FIG. 6 is an exemplary view showing a SUPL-based area event triggered service in accordance with a fourth embodiment of the present invention.

As shown in FIG. 6, the fourth embodiment of the present invention is nearly similar to the third embodiment of FIG. 5. However, the fourth embodiment of FIG. 6 is characterized in that the SLP#1 210 includes the location information in the SUPL END message for informing the end of the service and sends the message to the SET#1 110. That is, the fourth embodiment is implemented such that the SLP#1 210 sends the location information together with the SUPL END message.

The method of the present invention described so far can be implemented by software, hardware or any combination thereof. For example, the method of the present invention may be implemented by using codes or commands within a software program which can be operated by a processor (e.g., an internal microprocessor in a mobile terminal), and stored in storage media (e.g., an internal memory, a flash memory, a hard disc, etc.).

The preferred embodiments of the present invention are merely illustrative, but the scope of the present invention is not limited to the specific embodiments. Therefore, various modifications and variations can be made in the present invention without departing from the scope and the appended claims of the invention.

INDUSTRIAL AVAILABILITY

The present invention can avoid consumption of network resources by releasing an IP connection when a SUPL-based periodic triggered service starts.

Also, if location information is measured after the IP connection is released, only the fact that the location has been measured is notified to a requester. Then, only when a secure transmission is ensured after the notification, the requester is allowed to receive the location information. Accordingly, it is possible to prevent the location information from being exposed externally.

The invention claimed is:

1. A method for performing a location service based upon a Secure User Plane Location (SUPL), the method performed by a terminal including a SUPL agent and the method comprising:

receiving, by the SUPL agent of the terminal which requests a location of a target SUPL Enabled Terminal (SET), a response message from a server via a previously established secure IP connection and a session with the server, the response message indicating that a requested location service for the target SET is started;

releasing, by the SUPL agent of the terminal that has requested the location of the target SET, the secure IP connection with the server but maintaining the session in response to the reception of the response message;

receiving, by the SUPL agent of the terminal that has requested the location of the target SET, one or more report messages from the server, the report message indicating only that the location of the target SET has been measured; and obtaining, by the SUPL agent of the terminal that has requested the location of the target SET, location information related to the target SET from the server after respectively receiving the one or more report messages, wherein the obtaining of the location information includes:
  reestablishing, by the SUPL agent of the terminal that has requested the location of the target SET, the secure IP connection with the server in response to the reception of the report message; and
  receiving, by the SUPL agent of the terminal that has requested the location of the target SET, the location information on the target SET via the reestablished secure IP connection.

2. The method of claim 1, wherein the response message is a SUPL RESPONSE message.

3. The method of claim 1, wherein the response message comprises at least one of:
  a parameter indicating an ID of the session; and
  location information previously measured for the target SET.

4. The method of claim 1, wherein one or more of the report messages are received via WAP PUSH, SMS, UDP/IP or TCP/IP.

5. The method of claim 1, wherein one or more of the report messages comprise at least one of:
  a parameter indicating an ID of the session; and
  a parameter indicating the number of times for measuring the location of the target SET.

6. The method of claim 1, further comprising sending a location information request message to the server via the reestablished IP connection.

7. The method of claim 1, further comprising releasing the reestablished IP connection after receiving the location information.

8. The method of claim 1, further comprising:
  receiving from the server a report message indicating that the final location of the target SET has been measured;
  reestablishing the IP connection with the server in response to the reception of the report message; and
  receiving the final location information related to the target SET via the reestablished IP connection.

9. The method of claim 8, further comprising sending an end message to the server to inform the termination of the location service for the target SET.

10. The method of claim 8, further comprising receiving an end message from the server via the reestablished IP connection, the end message indicating the termination of the location service for the target SET.

11. A method for providing a location service based upon a Secure User Plane Location (SUPL), the method comprising:

establishing a secure IP connection and a session with a source terminal including a SUPL agent which is intended to request a location of a target SUPL Enabled Terminal (SET);

receiving from the source terminal a session start message including a location service request for the target SET;

sending a response message to the source terminal to inform that the requested service started;

releasing, by a server, the secure IP connection with the source terminal that has requested the location of the target SET and maintaining the session established with the source terminal;

sending a report message to the source terminal that has requested the location of the target SET, the report message indicating only that the location of the target SET has been measured;

reestablishing the secure IP connection with the source terminal that has requested the location of the target SET after sending the report message; and sending location information related to the target SET to the source terminal via the reestablished secure IP connection.

12. The method of claim 11, further comprising sending an end message to the source terminal via the reestablished IP connection to inform the termination of the location service for the target SET.

13. The method of claim 11, further comprising:
  receiving the end message from the source terminal via the reestablished IP connection, the end message indicating the termination of the location service for the target SET.

14. The method of claim 11, wherein the location information is sent to the source terminal by being included in the end message indicating the termination of the location service for the target SET.

15. A terminal comprising:
  a controller including a Secure User Plane Location (SUPL) agent and configured to perform steps of:
  receiving, by the SUPL agent which requests a location of a target SUPL Enabled Terminal (SET), a response message from a server via a previously established secure IP connection and a session with the server, the response message indicating that a requested location service for the target SET is started;
  releasing, by the SUPL agent that has requested the location of the target SET, the secure IP connection with the server but maintaining the session in response to the reception of the response message;
  receiving, by the SUPL agent that has requested the location of the target SET, one or more report messages from the server, the report message indicating only that the location of the target SET has been measured; and
  obtaining, by the SUPL agent, location information related to the target SET from the server after respectively receiving the one or more report messages,
  wherein the obtaining of the location information includes:
    reestablishing, by the SUPL agent that has requested the location of the target SET, the secure IP connection with the server in response to the reception of the report message; and
    receiving, by the SUPL agent that has requested the location of the target SET, the location information on the target SET via the reestablished secure IP connection.

* * * * *